US012376727B2

(12) United States Patent
Park et al.

(10) Patent No.: US 12,376,727 B2
(45) Date of Patent: Aug. 5, 2025

(54) DISHWASHER AND METHOD FOR DETECTING CAMERA FAILURE BY DISHWASHER

(71) Applicant: LG Electronics Inc., Seoul (KR)

(72) Inventors: Jekang Park, Seoul (KR); Changwoo Son, Seoul (KR); Baekeun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 17/488,569

(22) Filed: Sep. 29, 2021

(65) Prior Publication Data

US 2022/0095884 A1 Mar. 31, 2022

(30) Foreign Application Priority Data

Sep. 29, 2020 (KR) .......................... 10-2020-0127220

(51) Int. Cl.
*A47L 15/42* (2006.01)
*A47L 15/00* (2006.01)

(52) U.S. Cl.
CPC ....... *A47L 15/4295* (2013.01); *A47L 15/0063* (2013.01); *A47L 15/428* (2013.01); *A47L 2401/30* (2013.01); *A47L 2401/34* (2013.01)

(58) Field of Classification Search
CPC ............. A47L 15/4295; A47L 15/0063; A47L 15/428; A47L 2401/30; A47L 2401/34; A47L 2501/26; A47L 15/0049; G06V 10/56; G06V 10/62; G01N 21/94; H04N 5/2257; H04N 7/18; H04N 17/002
See application file for complete search history.

(56) References Cited

U.S. PATENT DOCUMENTS 7,974,458 B2* 7/2011 Huang ................. H04N 17/002
382/141
9,454,703 B2* 9/2016 Einecke ................. G06T 7/269
(Continued)

FOREIGN PATENT DOCUMENTS

DE 102015102694 8/2016
EP 3427630 1/2019
(Continued)

OTHER PUBLICATIONS

TW-201432250-A, Machine Translation (Year: 2024).*
(Continued)

*Primary Examiner* — Joshua L Allen
*Assistant Examiner* — Christopher Remavege
(74) *Attorney, Agent, or Firm* — Fish & Richardson P.C.

(57) ABSTRACT

According to an implementation of the present disclosure, the dishwasher includes a case forming an outer appearance of the dishwasher and defining an opening at a front side of the case; a door configured to open and close the opening; a tub configured to receive washing water; a sump disposed at a bottom surface of the tub and configured to collect and spray the washing water; a rack disposed inside the sump and configured to accommodate a dish; a dish recognition camera configured to capture an upper portion of the rack and disposed at at least one of an inner surface of the door or an inner surface of the tub; and a controller configured to control operation of the dishwasher and the dish recognition camera.

16 Claims, 17 Drawing Sheets

(56) References Cited

U.S. PATENT DOCUMENTS

| | | | | |
|---|---|---|---|---|
| 9,538,170 | B1* | 1/2017 | Lee | B08B 1/12 |
| 10,191,356 | B2* | 1/2019 | Laroia | G02B 27/0006 |
| 2008/0143856 | A1* | 6/2008 | Pinto | H04N 25/683 |
| | | | | 348/E9.037 |
| 2008/0205747 | A1* | 8/2008 | Kuchii | G06T 7/0004 |
| | | | | 382/149 |
| 2008/0247745 | A1* | 10/2008 | Nilsson | G03B 37/02 |
| | | | | 348/E5.042 |
| 2009/0135414 | A1* | 5/2009 | Chang | H04N 17/002 |
| | | | | 356/237.5 |
| 2011/0043668 | A1* | 2/2011 | McKinnon | H04N 25/683 |
| | | | | 348/E9.037 |
| 2011/0080494 | A1* | 4/2011 | Mori | H04N 23/743 |
| | | | | 348/222.1 |
| 2011/0242628 | A1* | 10/2011 | Morikawa | H04N 1/00087 |
| | | | | 358/504 |
| 2012/0138092 | A1* | 6/2012 | Ashrafzadeh | A47L 15/4295 |
| | | | | 134/57 D |
| 2014/0293079 | A1* | 10/2014 | Milanfar | H04N 23/811 |
| | | | | 348/222.1 |
| 2015/0356371 | A1* | 12/2015 | Libal | H04N 17/002 |
| | | | | 348/311 |
| 2016/0004144 | A1* | 1/2016 | Laroia | G03B 17/02 |
| | | | | 348/222.1 |
| 2016/0299675 | A1* | 10/2016 | Winde | A47L 15/0063 |
| 2017/0180659 | A1* | 6/2017 | Levoy | H04N 25/67 |
| 2018/0103185 | A1* | 4/2018 | Kim | H04N 23/45 |
| 2019/0200841 | A1* | 7/2019 | Yoshimoto | A47L 15/42 |
| 2019/0206042 | A1* | 7/2019 | Janssens | G06V 20/54 |
| 2019/0380559 | A1 | 12/2019 | Lee et al. | |
| 2020/0138263 | A1* | 5/2020 | Terrádez Alemany | A47L 15/4295 |
| 2020/0301382 | A1* | 9/2020 | Fawaz | G06T 7/70 |
| 2021/0145241 | A1* | 5/2021 | Dietrich | A47L 15/4244 |

FOREIGN PATENT DOCUMENTS

| | | | | |
|---|---|---|---|---|
| EP | 3434168 | | 1/2019 | |
| JP | 2018031598 | | 3/2018 | |
| TW | 201432250 | A * | 8/2014 | G02B 13/143 |
| WO | WO-2014061922 | A1 * | 4/2014 | G06K 9/00624 |

OTHER PUBLICATIONS

WO-2014061922-A1, Machine Translation. (Year: 2024).*
Extended European Search Report in European Appln. No. 21199727.5, dated Feb. 11, 2022, 7 pages.

* cited by examiner

601

601a

601b

607

DISHWASHER AND METHOD FOR DETECTING CAMERA FAILURE BY DISHWASHER

CROSS-REFERENCE TO RELATED APPLICATION

This application claims priority to and the benefit of Korean Patent Application No. 10-2020-0127220, filed on Sep. 29, 2020, the disclosure of which is incorporated herein by reference in its entirety.

TECHNICAL FIELD

The present disclosure relates to a dishwasher and a method for detecting a camera failure by the dishwasher.

BACKGROUND

A dishwasher may be defined as a device used to remove food and oil stains on a surface of a dish, wherein the dish to be washed is placed therein. The food and the oil stains can be removed by spraying washing water with detergent. For example, the washing water can be sprayed into an inside of a tub at high pressure and the sprayed washing water can contact the dishes to wash the food and oil stains on the surface of the dishes. However, as the stain can include hard or sharp materials such as bones and the washing water can be sprayed at high pressure, the objects in the stain moving can move upward by the spraying of the washing water and collide with an inner surface of the tub, thereby scratching the inner surface of the tub.

SUMMARY

The present application describes a dishwasher that can detect a failure of a dish recognition camera disposed inside the dishwasher by image processing a dish image and quickly respond to the failure of the dish recognition camera.

The present application also describes a dishwasher that can determine various types of failures by detecting an abnormal operation of a dish recognition camera in various ways and respond to the failures differently according to the types of failures.

The present application further describes a dishwasher that can prevent malfunction of the dishwasher by recognizing the failure of the dish recognition camera in advance.

These objects are achieved with the features of the independent claims. Preferred aspects are defined in the dependent claims.

According to one aspect of the subject matter described in this application, a dishwasher includes a case forming an outer appearance of the dishwasher and defining an opening at a front side of the case, a door configured to open and close the opening, a tub configured to provide a treating chamber, a sump disposed at a bottom surface of the tub and configured to collect and spray the washing water, a rack disposed inside the tub and configured to accommodate a dish, a dish recognition camera configured to capture an upper portion of the rack and disposed at at least one of (i) an inner surface of the door or (ii) an inner surface of the tub, and a controller configured to control operation of the dishwasher and the dish recognition camera, wherein the controller is configured to: obtain a first dish image and a second dish image captured at different time points by the dish recognition camera according to a preset operation, process the obtained first dish image and the second dish image, and based on a result of processing the obtained images, determine an abnormal operation of the dish recognition camera.

Implementations according to this aspect can include one or more of the following features. For example, the controller is configured to: extract one or more static pixels from pixels of the first dish image and pixels of the second dish image; classify an area of a plurality of adjacent static pixels a contamination area based on the one or more static pixels; and based on a number of static pixels in the contamination area exceeding a number of preset reference pixels, determine a state of the dish recognition camera as a lens damage state or a panel contamination state.

In some implementations, the controller is configured to: obtain the first dish image after a non-washing step of first cycle ends, and obtain the second dish image after a non-washing step of second cycle ends.

In some implementations, the controller is configured to: based on a brightness value of a pixel of the first dish image being identical to a brightness value of a pixel of the second dish image, determine that an image sensor of the dish recognition camera is damaged.

In some implementations, the controller is configured to control a lighting device to be turned on or turned off, and obtain the first dish image or the second dish imaged based on the lighting device being turned on or turned off. In some implementations, the controller is configured to, based on the lighting device being turned on, obtain the first dish image, and based on the lighting device being turned off, obtain the second dish image.

In some implementations, the controller is configured to, based on a color value of a pixel at a portion corresponding to an identifier of the first dish image or the second dish image being different from a color value of a pixel at a portion corresponding to an identifier of a preset reference image, determine a state of a color filter of the dish recognition camera as a failure state. In some implementations, the identifier is disposed at an upper portion of the rack.

According to another aspect, a method for detecting failure of a camera by a dishwasher includes obtaining a first dish image and a second dish image captured at different time points by a dish recognition camera according to a preset operation; image-processing the obtained first dish image and second dish image; and determining an abnormal operation of the dish recognition camera based on a result of the image-processing.

In some implementations, determining the abnormal operation of the dish recognition camera based on the result of the image-processing includes extracting a static pixel from a pixel of the first dish image and a pixel from the second dish image; classifying a contamination area based on the static pixel; and determining a state of the dish recognition camera as a lens damage state or a panel contamination state based on a number of static pixels in the contamination area exceeding a preset number of reference pixels.

In some implementations, obtaining the first dish image and the second dish image captured at the different time points by the dish recognition camera according to preset operation time points includes: obtaining the first dish image after a non-washing step of first cycle ends and obtaining the second dish image after a non-washing step of second cycle ends.

In some implementations, determining the abnormal operation of the dish recognition camera based on the result of the image-processing includes determining that an image sensor of the dish recognition camera is damaged, based on a brightness value of a pixel of the first dish image being identical to a brightness value of a pixel of the second dish image.

In some implementations, obtaining the first dish image and the second dish image captured at the different time points by the dish recognition camera according to the preset operation includes: obtaining the first dish image or the second dish image by controlling a lighting device to be turned on or turned off. In some implementations, the first dish image is obtained, based on the lighting device being turned on, and the second dish image is obtained, based on the lighting device being turned off.

In some implementations, determining the abnormal operation of the dish recognition camera based on the result of the image-processing includes determining a state of a color filter of the dish recognition camera as a failure state based on a color value of a pixel at a portion corresponding to an identifier in the first dish image or the second dish image being different from a color value of a pixel at a portion corresponding to an identifier in a preset reference image. In some implementations, the method further includes displaying the determined abnormal operation of the dish recognition camera by displaying an error message on a display of the dishwasher and transmitting an error code through wireless communication with a server.

DETAILED DESCRIPTION

Figure 1:
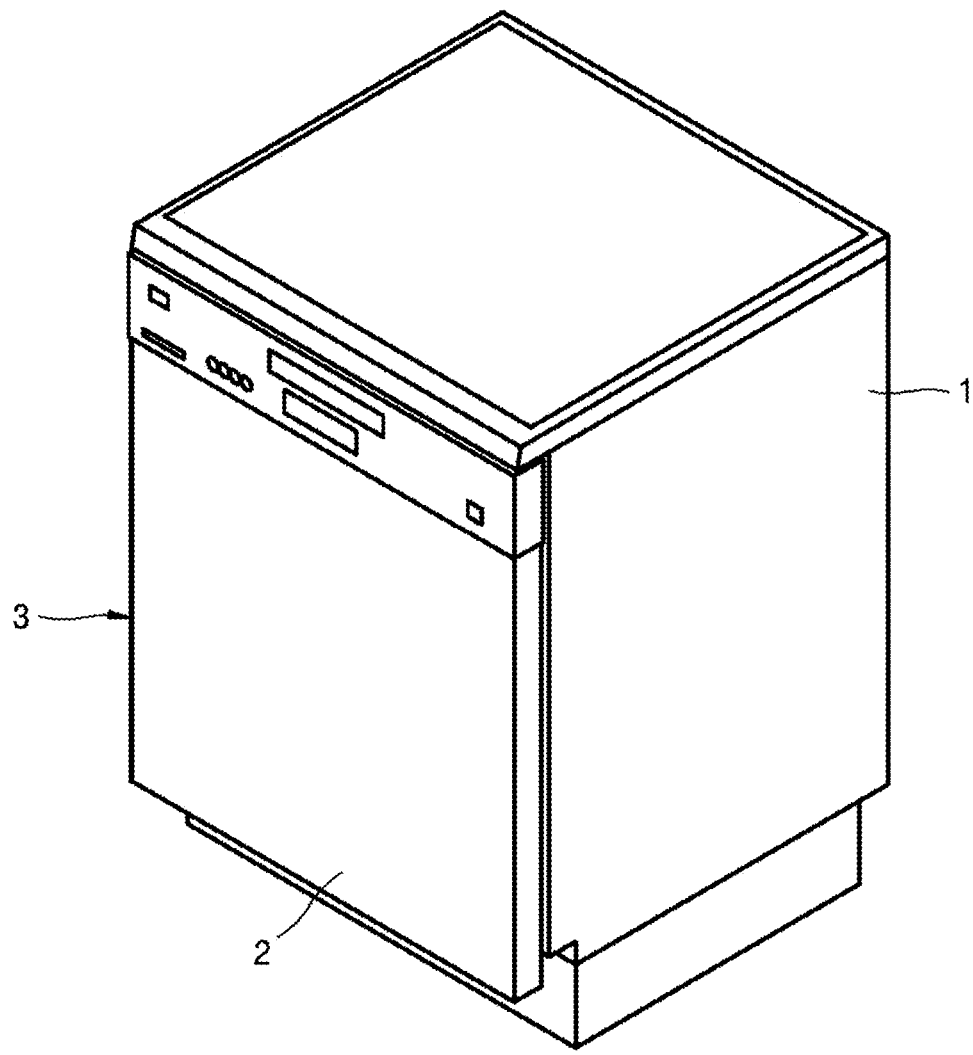
FIG. 1 is a perspective view of an example configuration of a dishwasher with a door being closed.

Hereinafter, one or more implementations of the present disclosure are described in detail with reference to the accompanying drawings. Same reference numerals may be used to refer to same or similar components.

Figure 2:
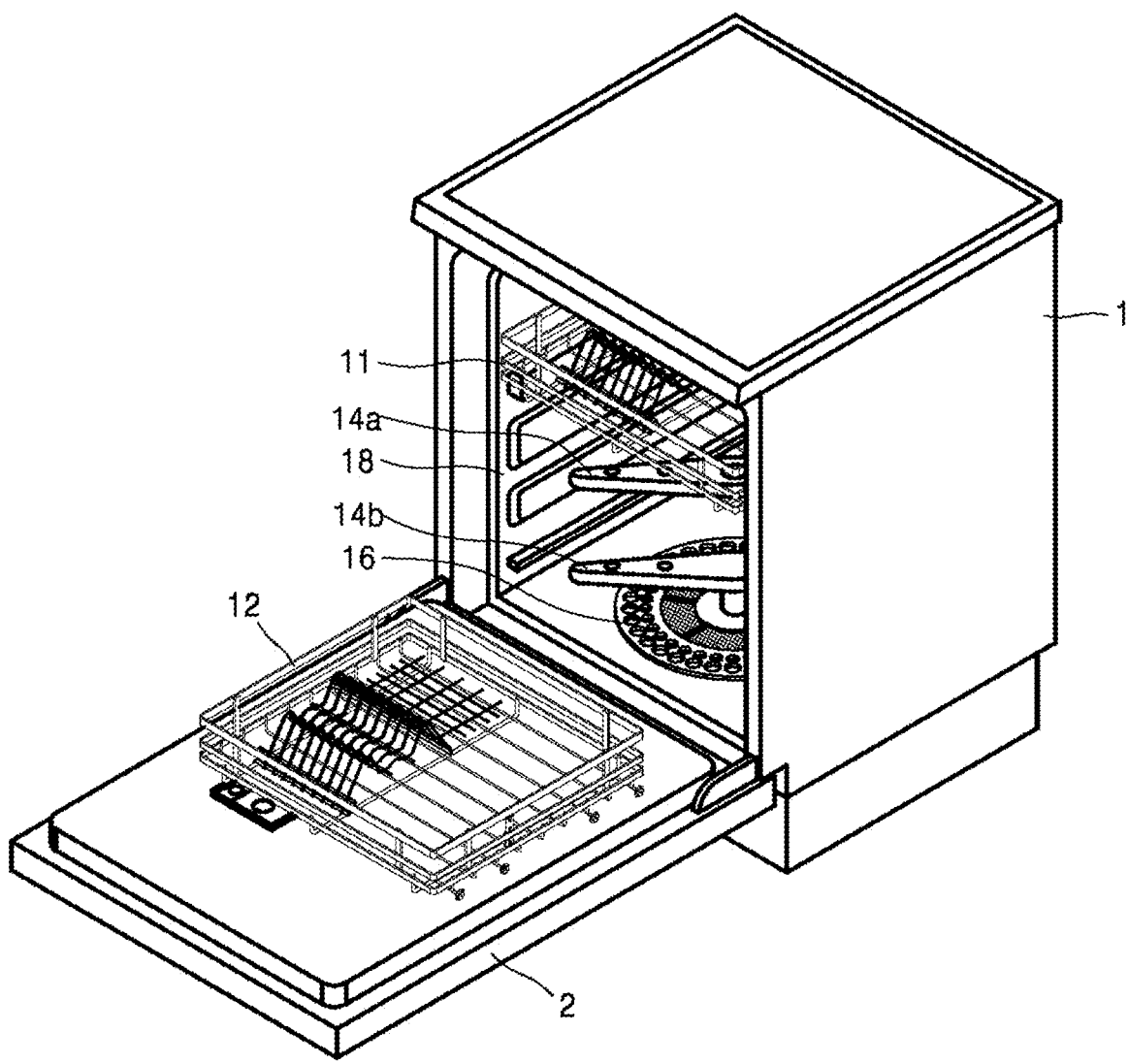
FIG. 2 is a perspective view of an example configuration of a dishwasher with a door being opened.
Figure 3:
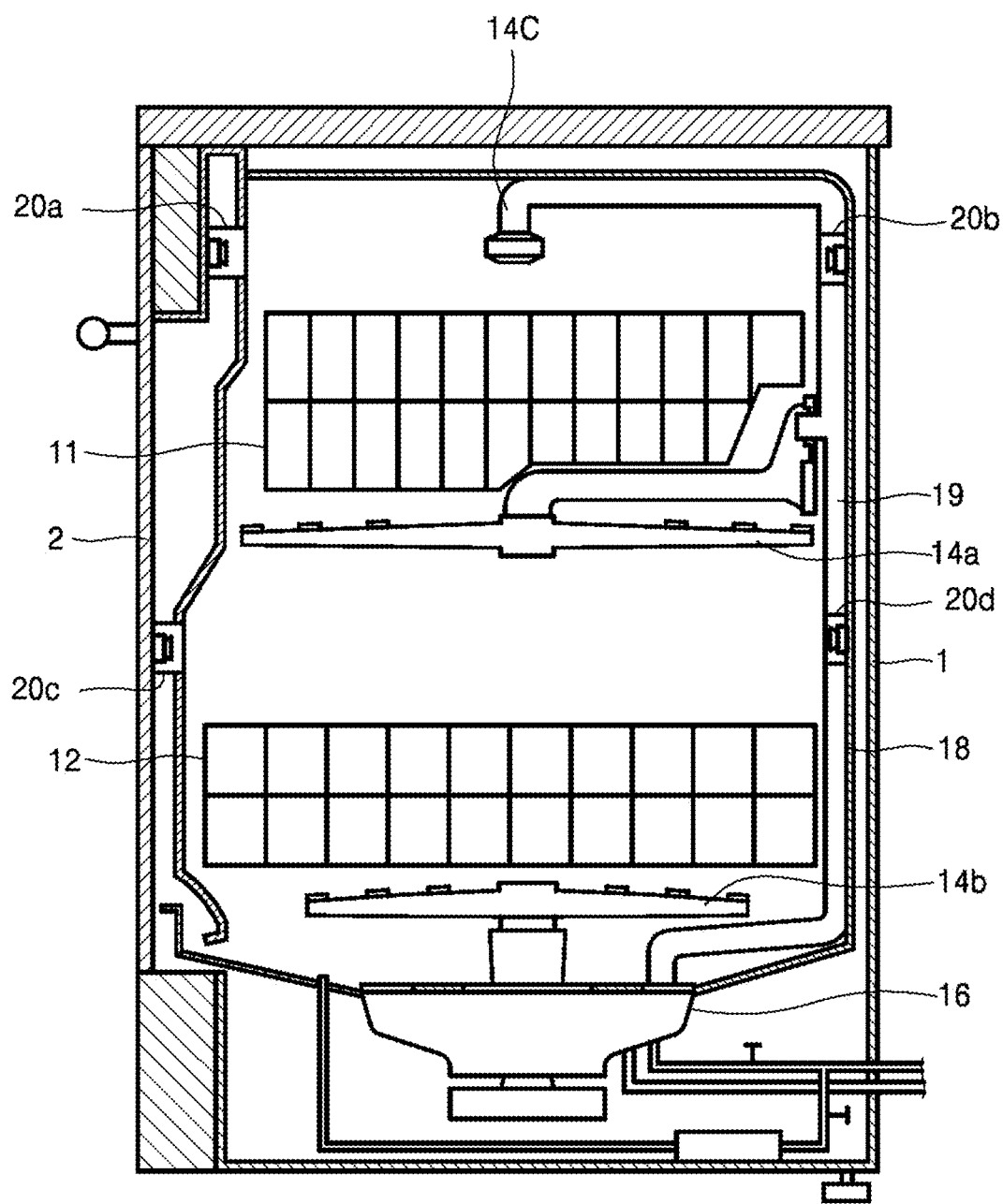
FIG. 3 is a side cross-sectional view of an example configuration of a dishwasher including dish recognition cameras.

An inner structure of the dishwasher is described in detail with reference to FIGS. 1 to 3. FIG. 1 is a perspective view of a dishwasher with a door being closed. FIG. 2 is a perspective view of a dishwasher with a door being opened.

Referring to FIG. 1, an exterior of the dishwasher includes a case 1 defining an opening at a front side thereof and a door 2 to close the opening at the front side of the case. The case 1 and the door 2 disposed in front of the dishwasher can close an inner space thereof to prevent or otherwise restrict washing water or detergent from leaking to the outside while washing the dishes.

Referring to FIG. 2, when a door 2 is opened, the door 2 can form a right angle of 90 degrees with a case 1. Inner components of a dishwasher can include a tub 18 to receive washing water, a sump 16 disposed at a bottom surface of the tub to collect and spray the washing water by filtering out foreign substances, a nozzle 14 connected to and rotating above the sump, and configured to spray the washing water into the tub, and an upper rack 11 and a lower rack 12 disposed at an upper portion and a lower portion thereof in the tub, respectively, and configured to accommodate a plurality of dishes.

The dishwasher can include a dish recognition camera in an inner surface of the tub to recognize a dish placed in the dishwasher. FIG. 3 is a side cross-sectional view of an example dishwasher including dish recognition cameras.

Referring to the drawings, outer components of the dishwasher 3 can include a case 1 defining an opening at a front side thereof and a door 2 to close the opening at the front side of the case 1, wherein the case 1 and the door 2 can define an outer appearance of the dishwasher 3. A tub 18 can be disposed in the dishwasher to receive the washing water and a sump 16 can be disposed on a bottom surface of the tub to collect the washing water and spray the washing water by filtering out foreign substances.

For example, a nozzle 14 can be disposed in the tub 18 and sprays the washing water toward the upper rack 11 and the lower rack 12. In addition, a washing water flow path 19 can be defined on an inner side surface of the tub 18 to supply the washing water to an upper nozzle 14a and a top nozzle 14c.

In addition, according to an implementation of the present disclosure, a dish recognition camera 20 can be disposed inside the tub 18. Referring to FIG. 3, a plurality of dish recognition cameras 20 can be disposed inside the tub 18. For example, dish recognition cameras 20a and 20b can be disposed above the upper rack 11 to capture the dish accommodated in the upper rack 11 and dish recognition cameras 20c and 20d can be disposed at a middle portion between the lower rack 12 and the upper rack 11 to capture the dishes accommodated in the lower rack 12.

In some implementations, the dish recognition camera 20 can be disposed at a side surface of the tub 18 or the door 2. For example, as shown in FIG. 3, the tub 18 or the door 2 may define a groove in the inner surface thereof and the dish recognition camera 20 may be inserted into the groove. In some implementations, the groove can be formed using a panel. The panel can be made of transparent material such as glass or plastic.

In some implementations, the dish recognition camera can be disposed inside a groove covered by the panel and formed inside the tub. Nevertheless, the failure rate of the dish recognition camera during the operation of the dishwasher is high. As the inside of the tub of the dishwasher is in a high temperature and high humidity environment, an image sensor of the dish recognition camera can be damaged. In some implementations, a lens of the dish recognition camera can be damaged or the panel can be scratched due to physical collision with the dishes, the food and oil stains, or the washing water. Furthermore, various types of failures can occur due to the food and oil stains and the washing water on the surface of the lens and foreign substances deposited on the surface of the lens.

In some implementations, when the failure of the dish recognition camera is not known in advance, the dishwasher obtains an incorrect dish image from the dish recognition camera due to the failure of the dish recognition camera, thereby resulting in malfunction of the dishwasher.

Figure 4:
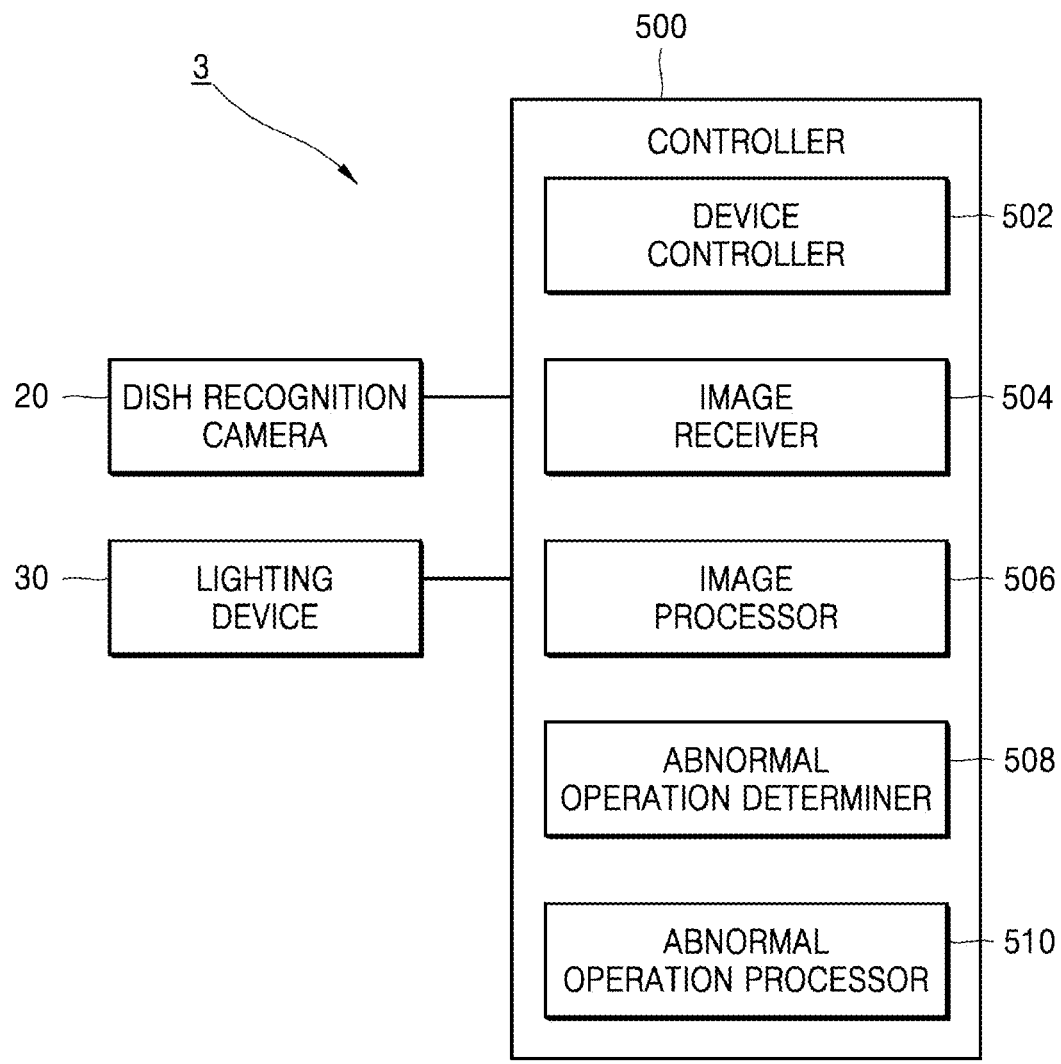
FIG. 4 is a schematic block diagram showing example components of a dishwasher.

FIG. 4 is a schematic block diagram showing example components of an example dishwasher. Referring to the drawing, a dish recognition camera 20 can be disposed on an inner surface of a tub or a door and can generate a dish image by capturing an upper portion of a rack. In some implementations, the dish recognition camera 20 can include a converting device to convert an external optical image signal into an electric image signal using an image sensor. For example, an image sensor can include a CMOS(Complementary Metal-Oxide Semiconductor) image sensor, i.e., CIS or a CCD (Charge-Coupled Device) sensor.

A lighting device 30 can be disposed at a side surface or an upper surface of the tub to illuminate an upper portion of an upper rack 11 or a lower rack 12. In some cases, a plurality of lighting devices 30 can be provided and controlled by a controller 500. The controller 500 can include a device controller 502, an image receiver 504, an image processor 506, an abnormal operation determiner 508, and an abnormal operation processor 510.

The device controller 502 can control the dish recognition camera 20 and the lighting device 30. In some cases, power can be applied to the lighting device 30, and the dish recognition camera 20 can capture the upper portion of the rack to generate a dish image based on a control signal from the device controller 502. The lighting device 30 and the dish recognition camera 20 may be sequentially or simultaneously controlled based on the control signal from the device controller 502, and the control signal may control on/off of the lighting device or control illuminance.

In some implementations, the device controller 502 can control operation steps of the dishwasher. For example, the device controller 502 may sequentially perform preliminary cleaning, main cleaning, rinsing, heat rinsing, and drying.

The image receiver 504 can receive the dish image and a reference image captured by the dish recognition camera 20. Subsequently, the image receiver 504 can transmit, to the image processor 506, the received dish image and reference image according to a request from the image processor 506.

The image processor 506 can process the received dish image using various methods. The image processing may be performed, for example, by comparing a number of static pixels of the dish image, comparing brightness values of the pixels of the dish images, or comparing with the reference image.

An abnormal operation determiner 508 can determine whether the dish recognition camera 20 is abnormally operated based on a result of processing the image by the image processor 506. The dish recognition camera 20 can perform various abnormal operations inside the tub. For example, the image sensor of the dish recognition camera may be damaged due to high temperature and high humidity inside the tub of the dishwasher, and the lens or the panel may be damaged due to physical collision with the dishes, the food or oil stains, or the washing water. In some implementations, the food and oil stains and the washing water may adhere to the surface of the lens and the foreign substances may be deposited on the surface of the lens. The abnormal operation determiner 508 can distinguish and determine the various abnormal operations based on the result of processing the image.

The abnormal operation processor 510 can respond to the abnormal operations according to the different types of abnormal operations. For example, the abnormal operation processor 510 can display a message notifying the determined abnormal operation on a display of the dishwasher or transmit abnormal operation information to a server to request a response thereto.

Figure 5:
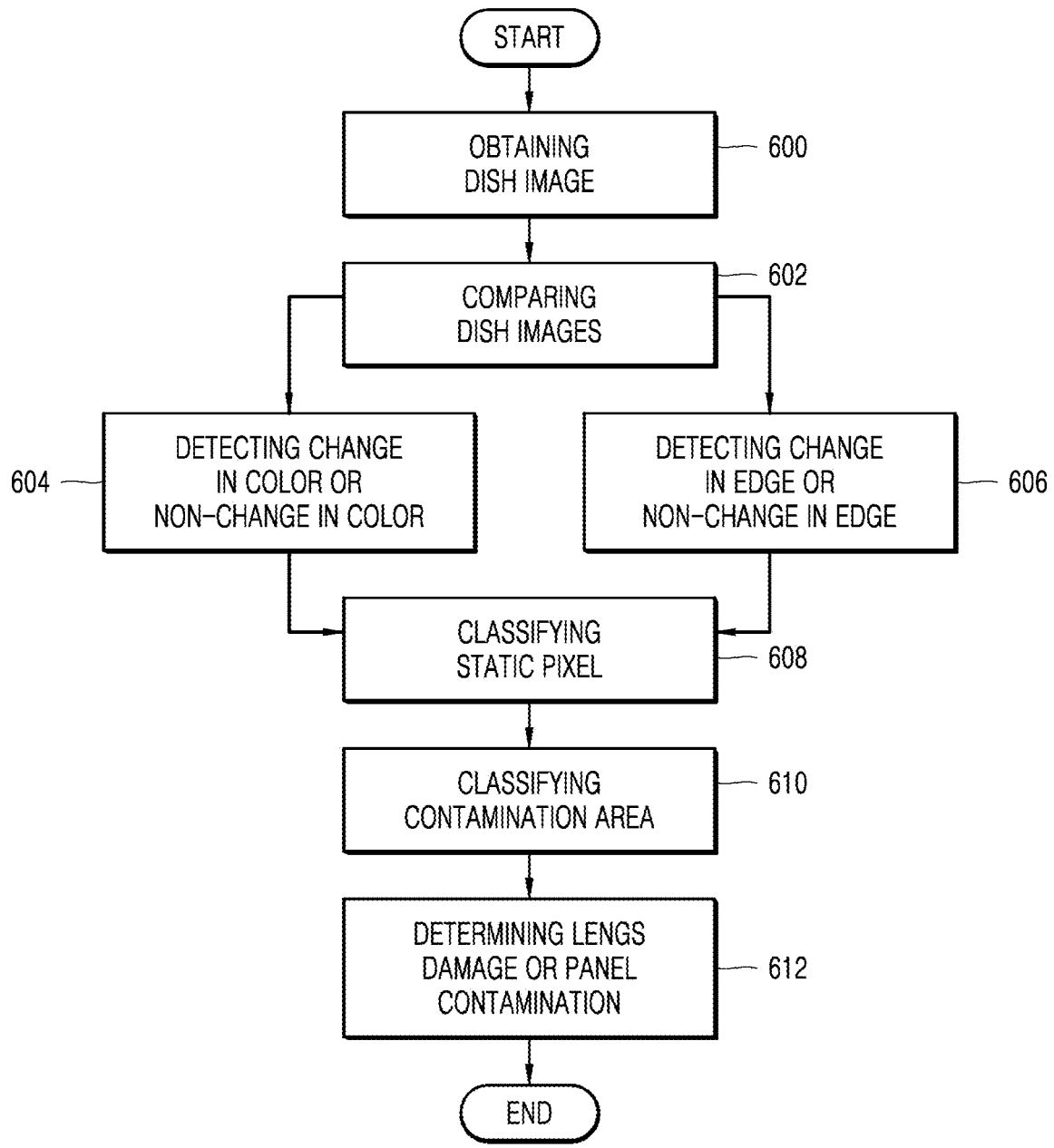
FIG. 5 is a flowchart showing an example operation of image processing and determining an abnormal operation to detect panel contamination or lens damage.

FIG. 5 is a flowchart showing an example operation of image processing and determining an abnormal operation to detect panel contamination or lens damage. FIGS. 6 to 9 show examples of image processing to detect panel contamination or lens damage. Hereinafter, in an implementation of the present disclosure, a method for determining an abnormal operation is described with reference to FIGS. 5 to 9.

A panel contamination can include contamination due to water spots generated by the washing water and deposits of foreign substances. A lens damage can include damage due to collision of the lens with the stain. As the panel contamination or lens damage may occur on the surface of the lens or the panel, the panel contamination or lens damage can have a fixed position and shape in the dish image regardless of a change in capturing angle of the dish recognition camera 20 or a change in the surrounding environment of the dish. Therefore, the panel contamination or the lens damage may be detected by comparing a plurality of dish images and detecting static pixels with no movement or no color change for a long period of time.

Figure 6:
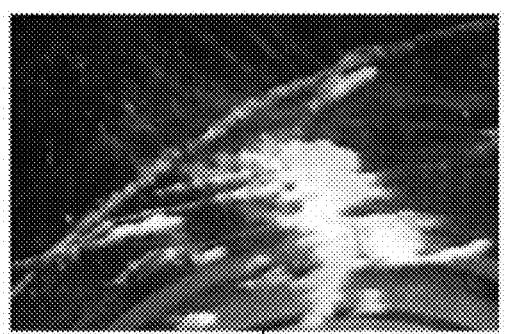
FIGS. 6 to 9 show examples of image processing to detect panel contamination or lens damage.
Figure 6:
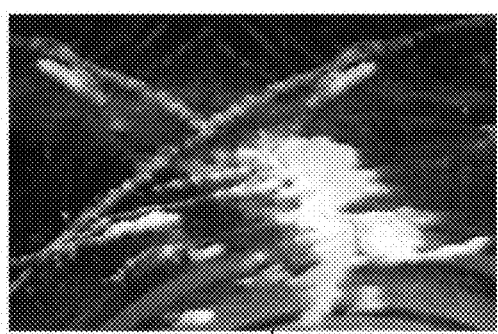

After the image receiver 504 obtains a first dish image and a second dish image captured at different time points or different angles by the dish recognition camera 20 (600), the image processor 506 can compare the received first dish image and second dish image (602). The two dish images 601 shown in FIG. 6 are examples of a first dish image 601a and a second dish image 601b.

The image processor 506 can compare the first dish image with the second dish image and extract static pixels based on the first dish image and the second dish image (608).

In some implementations, the image processor 506 can detect a change in color by image processing based on the dish images (604). In some implementations, a dish image can include a plurality of pixels, and each pixel has a color value. The image processor 506 may use a predetermined color model to classify the static pixel based on the color value. For example, the color model may include one of RGB (Red, Green, and Blue), CMYK (Cyan, Magenta, Yellow, and Black), HSV (Hue, Saturation, and Value), HSL (Hue, Saturation, or Lightness), or HEX (Hexadecimal color code). However, the present disclosure is not limited thereto and can be used with other color models used to express colors using a digital method.

Figure 7:
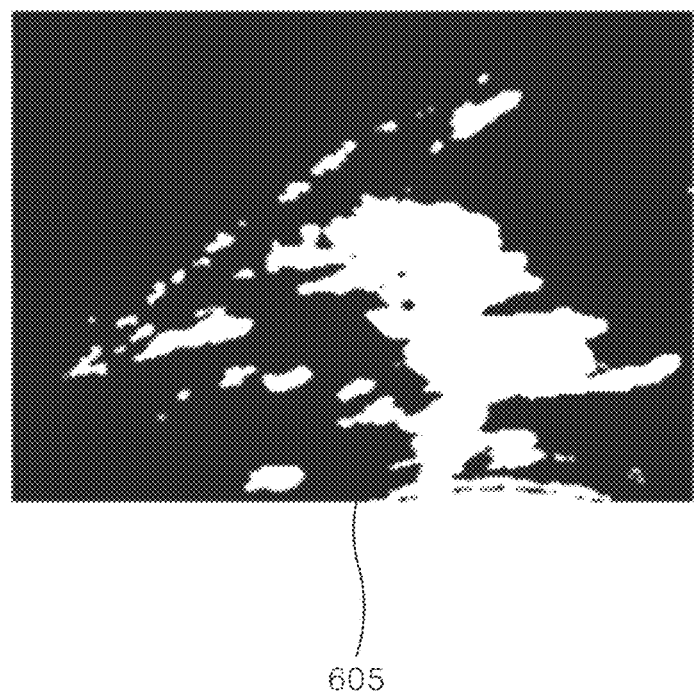
Figure 8:

The image processor 506 can classify a pixel from the dish images as a static pixel when there is no change in color value, then detect a plurality of adjacent static pixels among the classified static pixels, and classify an area of the plurality of adjacent static pixels as a contamination area (610). FIG. 7 shows an example static pixel image 605, which is a plurality of pixels with no change in color value among pixels of each of a first dish image 601a and a second dish image 601b. FIG. 8 shows an example contamination area 611 classified by detecting a plurality of adjacent static pixels based on the static pixel image 605.

An abnormal operation determiner 508 can preset a number of reference pixels for determining an abnormal operation. The abnormal operation determiner 508 may determine contamination of the panel or damage of the lens of the dish recognition camera 20 based on the number of static pixels in the classified contamination area 611 exceeding a preset number of reference pixels.

Figure 9:
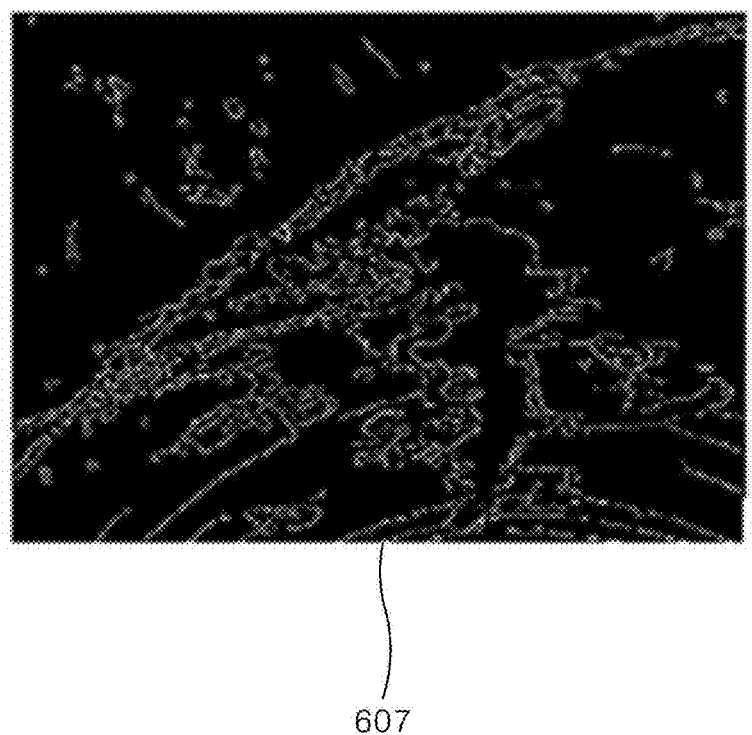

In some implementations, the image processor 506 can perform image processing and detect a change in an edge based on the dish images (606). For example, the image processor 506 can generate a boundary according to a difference in color values of the pixels from a dish image, thereby extracting an edge. FIG. 9 shows an example first edge image 607 extracted from the first dish image 601*a*.

In some implementations, the image processor 506 can compare the first edge image 607 extracted from the first dish image and a second edge image extracted from the second dish image (602) and detect a change in edge (606). In some implementations, the image processor 506 can classify a pixel as a static pixel when there is no edge change (608), and then classify an area of a plurality of adjacent static pixels among the classified static pixels as a contamination area (610).

In some cases, the abnormal operation determiner 508 can preset a number of reference pixels for determining an abnormal operation. Based on the number of static pixels in the classified contaminated area exceeding the preset number of reference pixels, the abnormal operation determiner 508 may determine that panel contamination or lens damage of the dish recognition camera 20 has occurred (612).

Meanwhile, in an environment in which washing water is sprayed, it can be difficult to accurately classify lens damage or panel contamination using static pixels. Accordingly, the device controller 502 may preset operation timing in order for the dish recognition camera 20 to capture the first dish image and the second dish image in a process in which the washing water is not sprayed.

In some implementations, an image receiver 504 can obtain a first dish image after a non-washing step of a first cycle in which washing water is not sprayed and obtain a second dish image after a non-washing step of a second cycle in which washing water is not sprayed.

For example, the dishwasher can include a plurality of operation steps including preliminary washing, main washing, rinsing, heat rinsing, and drying in one cycle and the cycle can be repeated. As a step in which the washing water is not sprayed can be a drying step, a non-washing step may be the drying step. The preset operation time point at which the dish recognition camera 20 generates a dish image can be a time point at which the drying step ends. The dish recognition camera 20 may generate a first dish image after the drying step of the first cycle ends and generate a second dish image after the drying step of the second cycle ends.

In some implementations, images can be referred to as the first dish image and the second dish image, but the image processor may compare a plurality of dish images, extract a static pixel and a determine a contamination area based on a plurality of three or more dish images. The abnormal operation determiner 508 can accurately determine panel contamination or lens damage by classifying the contamination area based on the three or more dish images.

An abnormal operation processor 510 can display a panel contamination or lens damage message on a display of the dishwasher 3 and transmit an error code through wireless communication with a server. Therefore, a user may directly wash the panel or the lens by recognizing the panel contamination or the lens damage, or a repair technician can be requested by the server and replace the panel or the lens, thereby reducing a possibility of malfunction of the dishwasher due to the damage to the image sensor.

Figure 10:
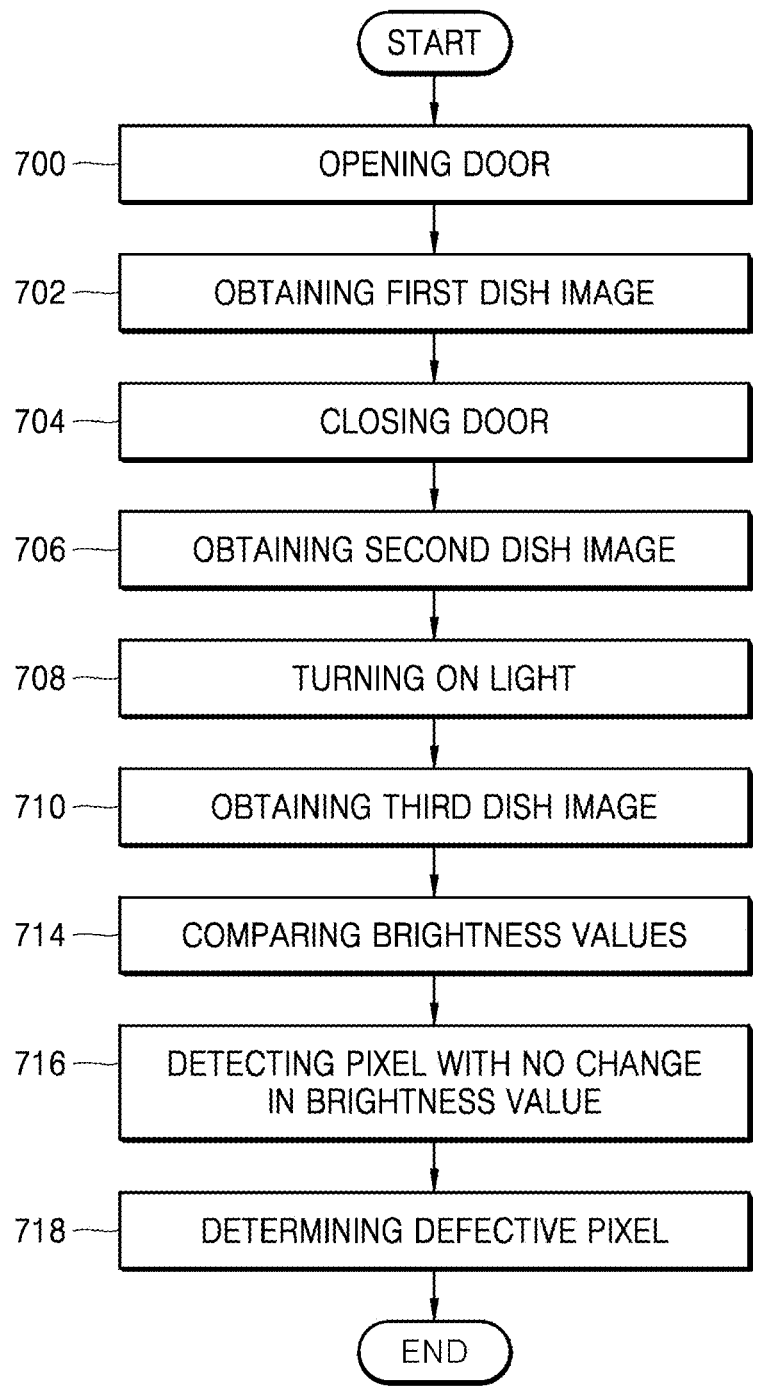
FIG. 10 is a flowchart showing an example operation of image processing and determining an abnormal operation to detect a defective pixel.
Figure 11:
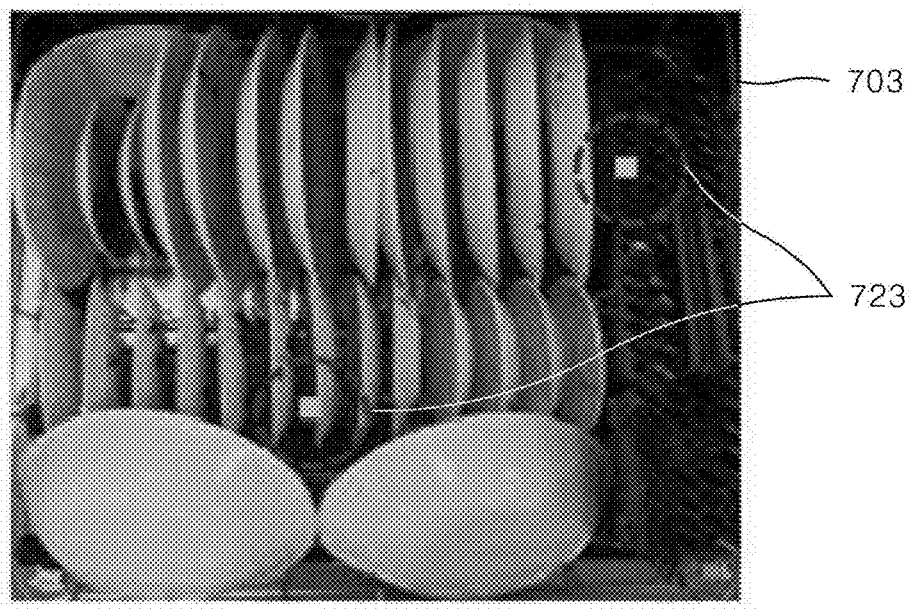
FIGS. 11 to 13 show examples of dish images according to an image processing method to detect a defective pixel.
Figure 12:
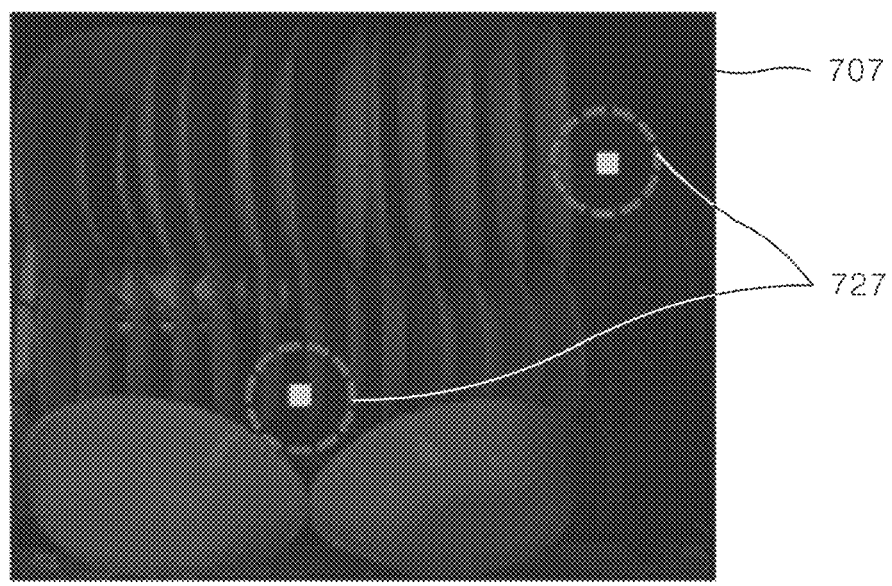
Figure 13:
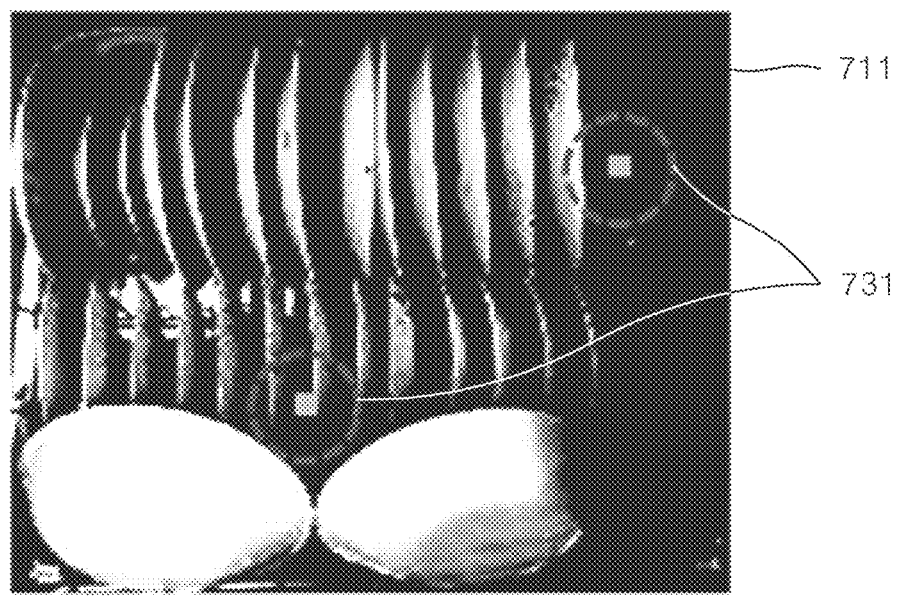

FIG. 10 is a flowchart of an example operation of image processing determining an abnormal operation to detect a defective pixel. FIGS. 11 to 13 show an example dish image according to an image processing method to detect a defective pixel. Hereinafter, a method for determining an abnormal operation is described with reference to FIGS. 10 to 13.

A defective pixel can be caused by damage to an image sensor disposed inside a dish recognition camera 20. The defective pixel may have no change in brightness value even if there is a change in brightness of light transmitted to the dish, which is a light capturing object. Therefore, by detecting a pixel with a constant brightness value, a defective pixel can be detected in an environment in which the brightness of light illuminating the dishes is rapidly changed by opening and closing a door and controlling on/off of a light.

FIG. 11 shows an example first dish image 703 generated when a door is open. FIG. 12 shows an example second dish image 707 generated when a door is closed. Referring to FIG. 10, when the user opens the door 2 of the dishwasher 3 (700), an image receiver 504 receives the first dish image generated from a dish recognition camera 20 (702). When the user closes the door 2 of the dishwasher 3 (704), the image receiver 504 receives the second dish image generated from the dish recognition camera 20 (706). In some cases, as a sudden change in brightness of light may need to occur, the door 2 can be quickly opened and closed by the user.

An image processor 506 can compare brightness values of pixels at the same position based on the obtained first dish image and second dish image (714) and then detect a pixel with no change in brightness value (716). Referring to FIGS. 11 and 12, a pixel 723 inside a circle indicated by dotted lines in the first dish image in FIG. 11 and a pixel 727 inside a circle indicated by dotted lines in the second dish image in FIG. 12 have the same brightness value. Therefore, the image processor 506 can detect the pixels 723 and 727 with no change in brightness value.

In some implementations, if the surrounding environment is dark at a time of opening and closing the door, the brightness values of all pixels may not be changed regardless of opening and closing of the door. Accordingly, by providing a rapid change in brightness of light inside the tub of the dishwasher through lighting control in a state in which the door is closed, the difference in brightness values may be clearly detected.

In some implementations, the image processor 506 may compare the dish images before and after the door is opened and closed and also compare additional dish images obtained by controlling on/off of light when the door is closed.

Referring to FIG. 10, after obtaining the second dish image, the device controller 502 can apply power to the lighting device 30 (708) and then the image receiver 504 may obtain a third dish image generated by the dish recognition camera 20 (710). The image processor 506 may compare brightness values of pixels at the same position based on the obtained first dish image to the third dish image (714) and detect the pixel with no change in brightness value (716). Subsequently, the abnormal operation determiner 508 may determine the detected pixel as a defective pixel (718).

Referring to FIGS. 11 to 13, the pixel 723 inside the circle indicated by the dotted lines in the first dish image in FIG. 11, the pixel 727 inside the circle indicated by the dotted lines in the second dish image in FIG. 12, and a pixel 731 inside a circle indicated by dotted lines in a third dish image in FIG. 13 can have the same brightness value. As shown, as the brightness values of the above pixels are not changed while brightness values of other surrounding pixels in the first dish image to the third dish image are changed, the image processor 506 may detect the pixels 723, 727, and 731 with no change in brightness value.

The abnormal operation determiner 508 may classify a pixel as a defective pixel when the pixel has the same detected brightness value and determine that the image sensor of the dish recognition camera 20 is damaged. The abnormal operation processor 510 may display an image sensor error message on the display of the dishwasher 3 and transmit an error code of the image sensor through wireless communication with the server. Therefore, the user recognizes the damage to the image sensor and replaces the image sensor directly, or a repair technician is requested by the server and replaces the image sensor, thereby reducing a possibility of malfunction of the dishwasher due to the damage to the image sensor.

Figure 14:
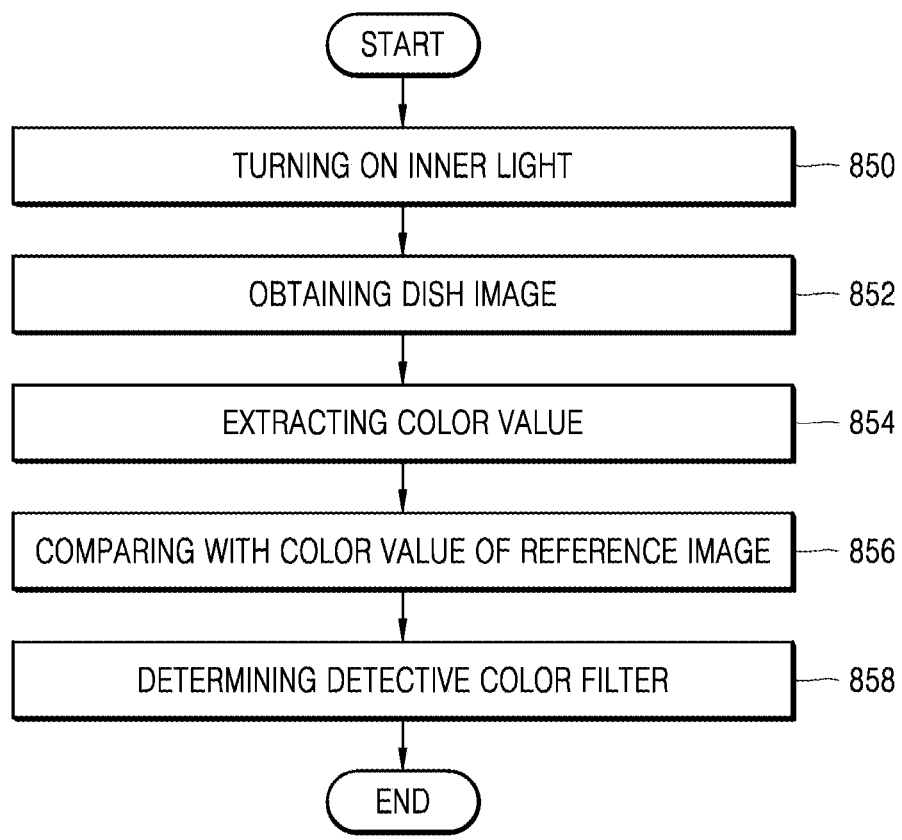
FIG. 14 is a flowchart showing an example operation of image processing and determining an abnormal operation to detect a defective color filter.
Figure 15:
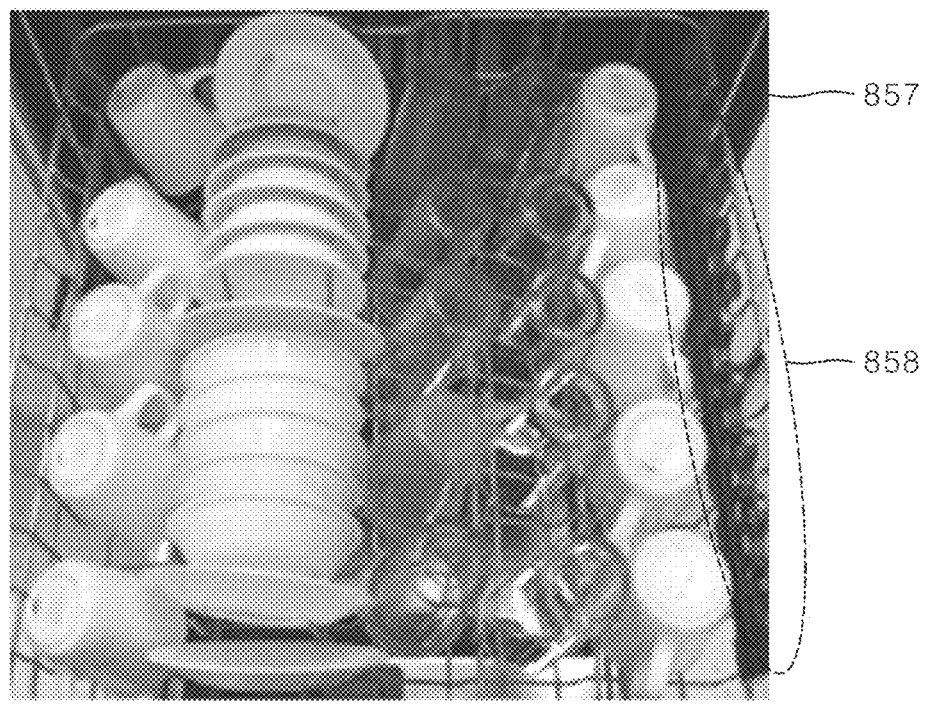
FIGS. 15 and 16 show examples of a dish image obtained when a color filter is in a normal state and a dish image obtained when the color filter is in a defective state, respectively.
Figure 16:
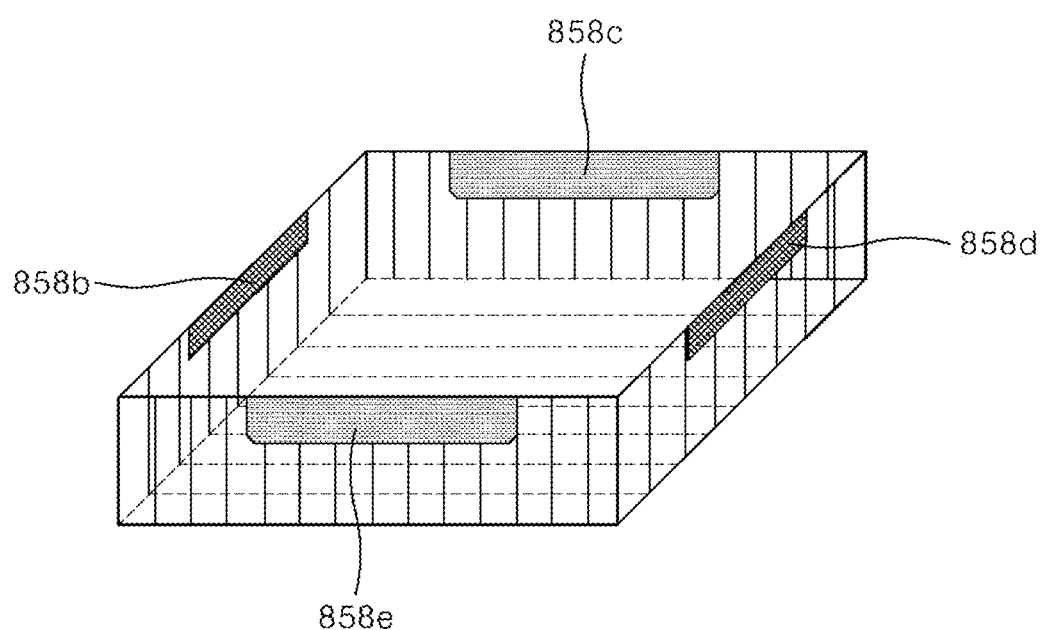

FIG. 14 is a flowchart of an example operation of image processing and determining an abnormal operation to detect a defective color filter. FIGS. 15 and 16 show an example dish image obtained when a color filter is normal, and an example dish image obtained when a color filter is defective, respectively. Hereinafter, in an implementation of the present disclosure, the method for determining the abnormal operation is described with reference to FIGS. 14 to 16.

Figure 17:
FIG. 17 shows a color filter damage image of a dish obtained when a color filter is in a defective state.

A color filter may be defective when a specific color component is omitted from a color value of a pixel in a dish image. FIG. 15 shows an example reference image 857 obtained when a color filter is normal. FIG. 17 shows an example color filter damage image 851 obtained when a color filter is in a defective state, that is, a specific color component is omitted from the color value of the dish image. As shown, if the specific color component is omitted, the corresponding color component may not display in the dish image as if a color filter is used. Therefore, the reference image 857 may be needed to determine whether there is an abnormality in color component or not.

Specifically, an identifier 858a may be disposed at one side of the upper rack 11 or the lower rack 12. The identifier is an identification element, which is a standard to determine normality or abnormality of color component, wherein two or more identifiers may be disposed in the rack, and may have different color values. In some implementations, the identifier may include an identifier 858a disposed in the rack as shown in FIG. 15 and may also include identifiers 858b, 858c, 858d, and 858e disposed at an upper portion of the rack as shown in FIG. 16. The rack of the present disclosure can include a plurality of identifiers to accurately determine failure or non-failure of the color filter of a dish recognition camera.

The dish recognition camera 20 can generate a dish image by capturing the upper portion of the rack including the identifier, and the image processor 506 may preset a dish image generated by the dish recognition camera in a normal state as the reference image 857. Referring to FIG. 14, when power is applied to a lighting device 30 (850), a controller 500 may acquire a dish image generated by the dish recognition camera 20 (852). The dish image obtained in an implementation of the present disclosure is described below on the assumption that it is the color filter damaged image 851 in FIG. 17.

In some implementations, the image processor 506 can extract a color value of a pixel of a portion corresponding to the identifier 858a of the color filter damage image 851 (854). Subsequently, the image processor 506 compares the color value of the pixel at the portion corresponding to the identifier of the dish image with that of the pixel at the portion corresponding to the identifier of a preset reference image (856). A color value of a pixel at a different portion than the portion corresponding to the identifier can be changed based on material and color of the dish. Therefore, the image processor 506 can compare the color value of the pixel with the color value of a pixel at the portion corresponding to the identifier having a fixed color value.

The abnormal operation determiner 508 may determine a state of the color filter of the dish recognition camera 20 as a failure state based on the color value of the pixel at the portion corresponding to the identifier of the dish image being different from that of the pixel at the portion corresponding to the identifier of the reference image (858).

The abnormal operation processor 510 may display a color filter error message on the display of the dishwasher 3 and transmit a color filter error code through wireless communication with the server. Therefore, the user recognizes damage to the color filter of the dish recognition camera 20 and directly replaces the dish recognition camera 20, or a repair technician can be requested by the server and replaces the color filter, thereby reducing malfunction of the dishwasher due to the damage to the color filter.

The dishwasher according to an implementation of the present disclosure may self-detect a failure of the dish recognition camera disposed inside the dishwasher by image processing based on a dish image and respond to the failure of the dish recognition camera.

In addition, the dishwasher according to an implementation of the present disclosure may detect various types of failures by detecting the abnormal operation of the dish recognition camera in various ways and respond to the failures differently according to the types of failures.

The present disclosure has been described with reference to exemplary drawings. However, the present disclosure is not limited to the implementations and drawings described herein and various modifications can be made by the skilled person in the art within the scope of the technical idea of the present disclosure. In addition, even if working effects obtained based on configurations of the present disclosure are not explicitly described in the description of embodiments of the present disclosure, effects predictable based on the corresponding configuration have to be recognized.

What is claimed is:

1. A dishwasher, comprising:
   a case forming an outer appearance of the dishwasher and defining an opening at a front side of the case;
   a door configured to open and close the opening;
   a tub configured to provide a treating chamber;
   a rack disposed inside the tub and configured to accommodate a dish;
   a dish recognition camera configured to capture an upper portion of the rack, the dish recognition camera being covered by a panel and disposed at at least one of (i) an inner surface of the door or (ii) an inner surface of the tub; and
   a controller configured to control operation of the dishwasher and the dish recognition camera,
   wherein the controller is configured to:
      obtain a first dish image and a second dish image captured at different time points by the dish recognition camera according to a preset operation,
      process the obtained first dish image and the second dish image, and based on a result of processing the obtained images, determine a lens damage state of the dish recognition camera or a panel contamination state, wherein the first dish image and the second dish image are obtained by capturing the same area, and wherein the controller is configured to compare the first dish image and the second dish image to (i) classify a pixel having no change in color value or edge between the first dish image and the second dish image as a static pixel, (ii) classify an area of a plurality of adjacent static pixels as a contamination area and (iii) determine the lens damage state of the dish recognition camera or the panel contamination state based on the contamination area.

2. The dishwasher of claim 1, wherein the controller is configured to determine the lens damage state of the dish recognition camera or the panel contamination state based on the contamination area and based on a number of static pixels in the contamination area exceeding a number of preset reference pixels.

3. The dishwasher of claim 2, wherein the controller is configured to:
obtain the first dish image after a non-washing step of a first cycle ends, and
obtain the second dish image after a non-washing step of second cycle ends.

4. The dishwasher of claim 1, wherein the controller is configured to, based on a brightness value of a pixel of the first dish image being identical to a brightness value of a pixel of the second dish image, determine that an image sensor of the dish recognition camera is damaged.

5. The dishwasher of claim 4, wherein the controller is configured to control a lighting device to be turned on or turned off, and obtain the first dish image or the second dish image based on the lighting device being turned on or turned off.

6. The dishwasher of claim 5, wherein the controller is configured to, based on the lighting device being turned on, obtain the first dish image, and based on the lighting device being turned off, obtain the second dish image.

7. The dishwasher of claim 1, wherein the controller is configured to, based on a color value of a pixel at a portion corresponding to an identifier of the first dish image or the second dish image being different from a color value of a pixel at a portion corresponding to an identifier of a preset reference image, determine a state of a color filter of the dish recognition camera as a failure state.

8. The dishwasher of claim 7, wherein the identifier is disposed at an upper portion of the rack.

9. A method for detecting failure of a camera by a dishwasher, comprising:
obtaining a first dish image and a second dish image captured at different time points by a dish recognition camera according to a preset operation;
image-processing the obtained first dish image and second dish image; and
determining a lens damage state of the dish recognition camera or a panel contamination state based on a result of the image-processing,
wherein image-processing the obtained first dish image and second dish image includes:
comparing the first dish image and the second dish image to detect a static pixel;
classifying a pixel having no change in color value or edge between the first dish image and the second dish image as a static pixel,
classifying an area of a plurality of adjacent static pixels as a contamination area; and
determining the lens damage state of the dish recognition camera or the panel contamination state based on the contamination area,
wherein the first dish image and the second dish image are obtained by capturing the same area.

10. The method of claim 9, wherein determining the lens damage state of the dish recognition camera or a panel contamination state based on a result of the image-processing comprises:
determining the lens damage state of the dish recognition camera or the panel contamination state based on a number of static pixels in the contamination area exceeding a preset number of reference pixels.

11. The method of claim 9, wherein obtaining the first dish image and the second dish image captured at the different time points by the dish recognition camera according to preset operation time points comprises:
obtaining the first dish image after a non-washing step of first cycle ends; and
obtaining the second dish image after a non-washing step of second cycle ends.

12. The method of claim 9, further comprises determining that an image sensor of the dish recognition camera is damaged, based on a brightness value of a pixel of the first dish image being identical to a brightness value of a pixel of the second dish image.

13. The method of claim 9, wherein obtaining the first dish image and the second dish image captured at the different time points by the dish recognition camera according to the preset operation comprises: obtaining the first dish image or the second dish image by controlling a lighting device to be turned on or turned off.

14. The method of claim 13, wherein the first dish image is obtained, based on the lighting device being turned on, and the second dish image is obtained, based on the lighting device being turned off.

15. The method of claim 9, further comprises determining a state of a color filter of the dish recognition camera as a failure state based on a color value of a pixel at a portion corresponding to an identifier in the first dish image or the second dish image being different from a color value of a pixel at a portion corresponding to an identifier in a preset reference image.

16. The method of claim 9, wherein the method further comprises displaying the determined abnormal operation of the dish recognition camera by (i) displaying an error message on a display of the dishwasher and (ii) transmitting an error code through wireless communication with a server.

* * * * *